US012552154B2

(12) United States Patent
Nagayama et al.

(10) Patent No.: US 12,552,154 B2
(45) Date of Patent: Feb. 17, 2026

(54) LIQUID DISCHARGE APPARATUS AND CONTROL METHOD THEREOF

(71) Applicant: CANON KABUSHIKI KAISHA, Tokyo (JP)

(72) Inventors: Hiroyuki Nagayama, Kanagawa (JP); Yuzuru Ishida, Kanagawa (JP); Koichi Omata, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 147 days.

(21) Appl. No.: 18/504,703

(22) Filed: Nov. 8, 2023

(65) Prior Publication Data

US 2024/0173967 A1 May 30, 2024

(30) Foreign Application Priority Data

Nov. 25, 2022 (JP) ................................ 2022-188657

(51) Int. Cl.
*B41J 2/045* (2006.01)

(52) U.S. Cl.
CPC ......... *B41J 2/04541* (2013.01); *B41J 2/0458* (2013.01)

(58) Field of Classification Search
CPC ............................ B41J 2/04541; B41J 2/0458
See application file for complete search history.

(56) References Cited

U.S. PATENT DOCUMENTS

| | | | |
|---|---|---|---|
| 7,950,769 B2 | 5/2011 | Sakai et al. | |
| 9,308,722 B2 | 4/2016 | Ishida et al. | |
| 9,682,552 B2 | 6/2017 | Kato et al. | |
| 2019/0061343 A1* | 2/2019 | Misumi | B41J 2/04541 |

FOREIGN PATENT DOCUMENTS

| | | |
|---|---|---|
| JP | 2008-105364 A | 5/2008 |
| JP | 2009-051146 A | 3/2009 |

OTHER PUBLICATIONS

U.S. Appl. No. 18/396,873, Yuzuru Ishida Shinya Iwahashi Yoshinori Misumi Koichi Ishida, filed Dec. 27, 2023.

* cited by examiner

*Primary Examiner* — Jason S Uhlenhake
(74) *Attorney, Agent, or Firm* — Venable LLP

(57) ABSTRACT

A liquid discharge apparatus includes a liquid discharge head having a discharge port, a liquid chamber that communicates with the discharge port, a heat generating resistor provided in the liquid chamber, and a first electrode and a second electrode provided in the liquid chamber; and a control unit that controls potential to the first electrode and the second electrode, on the basis of a potential control condition according to the type of the liquid. The first electrode is provided so as to overlap a position at which the heat generating resistor is provided, and the second electrode is provided so as not to overlap a position at which the first electrode is provided. The control unit modifies the potential control condition in accordance with changes in the composition of the liquid.

9 Claims, 11 Drawing Sheets

LIQUID DISCHARGE APPARATUS AND CONTROL METHOD THEREOF

BACKGROUND OF THE INVENTION

Field of the Invention

The present invention relates to a liquid discharge apparatus and to a control method thereof.

Description of the Related Art

In liquid discharge heads utilized in inkjet recording apparatuses, a scheme is often the resorted to in which a heat generating resistor is energized to thereby heat a liquid up in the interior of a liquid chamber, such that liquid droplets are discharged from discharge ports by exploiting the bubbling energy generated upon film boiling of the liquid.

In such a liquid discharge head, physical effects such as cavitation shocks, arising through formation shrinkage and collapse of bubbles in the liquid, may act on a region above the heat generating resistor. At the time of discharge of the liquid, moreover, the heat generating resistor is at a high temperature and accordingly the components of the liquid may decompose thermally and adhere to the region above the heat generating resistor, giving rise to chemical effects such as fixation and deposition. With a view to protecting the heat generating resistor against these physical or chemical actions that act on the heat generating resistor, the liquid discharge head has disposed thereon a protective layer, for instance made up of a metallic material, that covers the heat generating resistor.

When the liquid is heated at a high temperature, a colorant and additives contained in the liquid may break down at the molecular level, and turn into sparingly soluble substances. A phenomenon may then occur in which such substances become physically adsorbed on a thermal action portion, which is the portion, on the protective layer on the heat generating resistor, that is in contact with the liquid. This phenomenon is referred to as "kogation". When a sparingly soluble organic substance or inorganic substance becomes thus adsorbed onto the thermal action portion of the protective layer, transfer of heat from the thermal action portion to the liquid becomes uneven, and bubbling unstable.

To counter such kogation, Patent Literature 1 (Japanese Patent Application Publication No. 2008-105364) discloses a method of removing kogation by causing the surface of a coating portion, formed of iridium or ruthenium, to elute into a liquid as a result of electrochemical reactions. Specifically, a kogation removal cleaning method is disclosed wherein after the start of an ink suction operation, voltage is applied to an upper protective layer for causing the upper protective layer to elute as a result of an electrochemical reaction. In consequence, bubbles generated in the electrochemical reaction do not grow to be large, and are discharged through ink suction, thanks to which kogation can be removed uniformly and reliably.

Other techniques, as in Patent Literature 2 (Japanese Patent Application Publication No. 2009-051146), exploit the fact that solid solutions in ink are in a dispersed state, in the form of a colloid. This technique, referred to as potential control, takes advantage of the fact that colloid surfaces are charged, such that the abundance of colloidal particles directly above electrodes is reduced, and the amount of solid solution that gives rise to kogation is likewise reduced, through application of voltage to the upper protective layer.

SUMMARY OF THE INVENTION

The magnitude and polarity of the potential that is applied to the upper protective layer in conventional kogation removal and potential control vary depending on ink type. Upon application of excessive potential, not only kogation deposits, but also the underlying protective film, are abraded excessively, which shortens the life of the discharge head. Depending on the polarity of the applied voltage, moreover, the abundance of colloidal particles on electrodes is increased, and kogation deposits become contrariwise likelier to stick. It is hence necessary to select a potential control condition suited to the ink that is used. In a conceivable approach, therefore, kogation removal and potential control conditions for each ink may be listed in a storage device of the main body of the apparatus, with relevant conditions being then selected therefrom.

The composition of inks changes, however, even slightly, depending on the time elapsed from production of the ink until ready to be used in the apparatus, and on the environment in which the apparatus is installed. If, for instance, the time between ink production and ink use is prolonged, ink solvents may volatilize, and the composition of the ink may change accordingly. In studies by the applicant, the above-described potential control significantly affects the discharge velocity of the ink, and accordingly, the discharge velocity changes when the composition changes, which has a significant impact on print quality. As a result, print quality may change, and the functionality of the apparatus may fail to be achieved, when the conditions listed in the apparatus are adopted as they are.

It is thus an object of the present invention, arrived at in the light of the above issues, to perform kogation removal under appropriate potential control conditions in a liquid discharge apparatus, also upon changes in ink composition.

The present invention provides a liquid discharge apparatus, comprising:

a liquid discharge head having a discharge port for discharging a liquid, a liquid chamber configured to communicate with the discharge port, a heat generating resistor provided in the liquid chamber and configured to be capable, by generating heat, of discharging the liquid from the discharge port, and a first electrode and a second electrode provided in the liquid chamber; and a control unit configured to control application of potential to the first electrode and the second electrode, on the basis of a potential control condition according to the type of the liquid, wherein with the liquid chamber viewed from a direction in which the discharge port is provided, the first electrode is provided so as to overlap a position at which the heat generating resistor is provided, and the second electrode is provided so as not to overlap a position at which the first electrode is provided; and the control unit is configured to modify the potential control condition in accordance with changes in physical properties of the liquid.

The present invention also provides a method for controlling a liquid discharge apparatus that has:

a liquid discharge head having a discharge port for discharging a liquid, a liquid chamber configured to communicate with the discharge port, a heat generating resistor provided in the liquid chamber and configured to be capable, by generating heat, of discharging the liquid from the discharge port, and a first electrode and a second electrode provided in the liquid chamber; and a control unit, such that, with the liquid chamber viewed from a direction in which the discharge port is provided, the first electrode is provided so as to overlap a position at which the heat generating resistor is provided, and the second electrode is provided so as not to overlap a position at which the first electrode is provided;

the method comprising a step of controlling, by way of the control unit, application of potential to the first electrode and the second electrode, on the basis of a potential control condition according to the type of the liquid, wherein the control unit is configured to modify the potential control condition in accordance with changes in physical properties of the liquid.

The present invention allows for kogation removal under appropriate potential control conditions, in a liquid discharge apparatus, also upon changes in ink composition.

Further features of the present invention will become apparent from the following description of exemplary embodiments with reference to the attached drawings.

DESCRIPTION OF THE EMBODIMENTS

Embodiments of the present invention will be explained in detail next with reference to accompanying drawings. However, the dimensions, materials, shapes, relative arrangement and so forth of the constituent parts described in the present embodiments are to be modified as appropriate in accordance with the configuration of the apparatus to which the invention is to be applied, and depending on various conditions; that is, the scope of the present invention is not meant to be limited to the embodiments below.

Embodiment 1

The present embodiment is an inkjet recording apparatus of a form in which a liquid such as an ink is caused to circulate between a tank and a liquid discharge apparatus. The present invention can also be regarded as an inkjet recording apparatus (also referred to as a "liquid recording apparatus" or "recording apparatus"), or as a liquid discharge apparatus, or as a control method of the foregoing.

Inkjet Recording Apparatus

Figure 1:
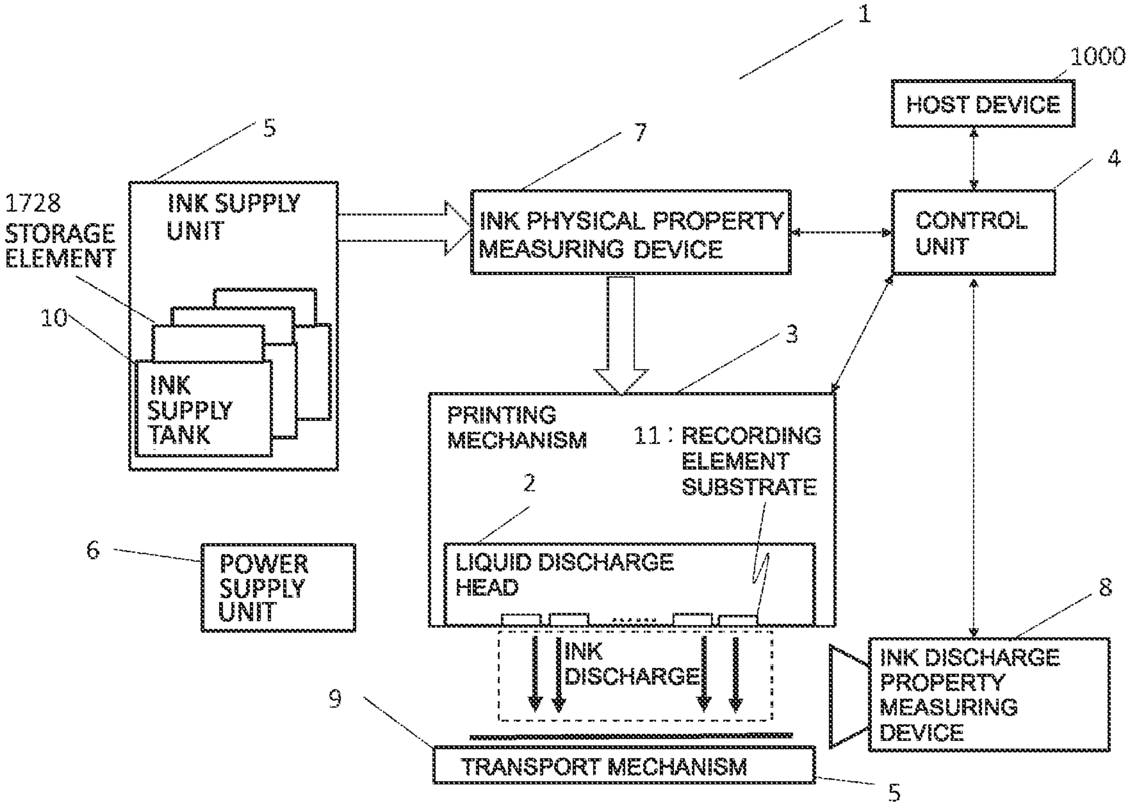
FIG. 1 is a block diagram illustrating the schematic configuration of a recording apparatus.

FIG. 1 illustrates a block diagram of the schematic configuration of an inkjet recording apparatus 1 of the present embodiment. The recording apparatus 1 includes schematically a printing mechanism 3, a control unit 4 that controls the entirety of the of the apparatus, a transport mechanism 30 that transports a recording material, an ink supply unit 5 that supplies ink, a power supply unit 6 that supplies power to the apparatus, an ink physical property measuring device 7 that measures a physical property of the ink, and an ink discharge property measuring device 8 that measures a discharge property of the ink.

The printing mechanism 3 will be explained next. The printing mechanism 3 includes a liquid discharge head 2 that discharges ink towards a recording material 9. Although only one liquid discharge head 2 is illustrated in the figure, there may be present a plurality of liquid discharge heads. The recording material 9, which is for instance a material such as paper, plastic or cloth, is formed in a sheet shape that is transported underneath the liquid discharge head by the transport mechanism 30.

The ink supply unit 5 includes a storage element and a plurality of removable ink supply tanks 10. Ink is supplied from the ink supply unit 5 to the liquid discharge head 2 in the printing mechanism 3, via the ink physical property measuring device 7, by a pumping device such as a pump. Multiple recording element substrates 11 are disposed within the liquid discharge head 2. Printing is accomplished on the recording material 9 directly underneath as ink is discharged from the recording element substrates 11.

The ink physical property measuring device 7 is a device, disposed in an ink flow channel from the ink supply unit 5 to the printing mechanism 3, that measures the physical property of the ink and transmits an output signal to the control unit 4. The ink physical property measuring device 7 is typically a conductivity meter in which electrodes are disposed in an ink flow channel, and which measures the conductivity of ink. However, the physical property of the ink is not limited to conductivity, and may be for instance resistivity measured by a resistivity meter, viscosity measured by a viscometer, or flow rate measured by a flow rate meter.

The ink discharge property measuring device 8 is a device that measures a property at a time when the printing mechanism 3 is discharging an ink, and that transmits an output signal to the control unit 4. The ink discharge property measuring device 8 is typically a velocity meter, made up of a camera and an image analysis unit, for measuring the discharge velocity of ink. However, the discharge property of ink is not limited to velocity, and may be, for instance, an interval between droplets, or the straightness of the droplet trajectory. Also, a discharge property other than the foregoing velocities can be measured by way of an apparatus having a camera and an image analysis unit.

Liquid Discharge Head

Figure 2:
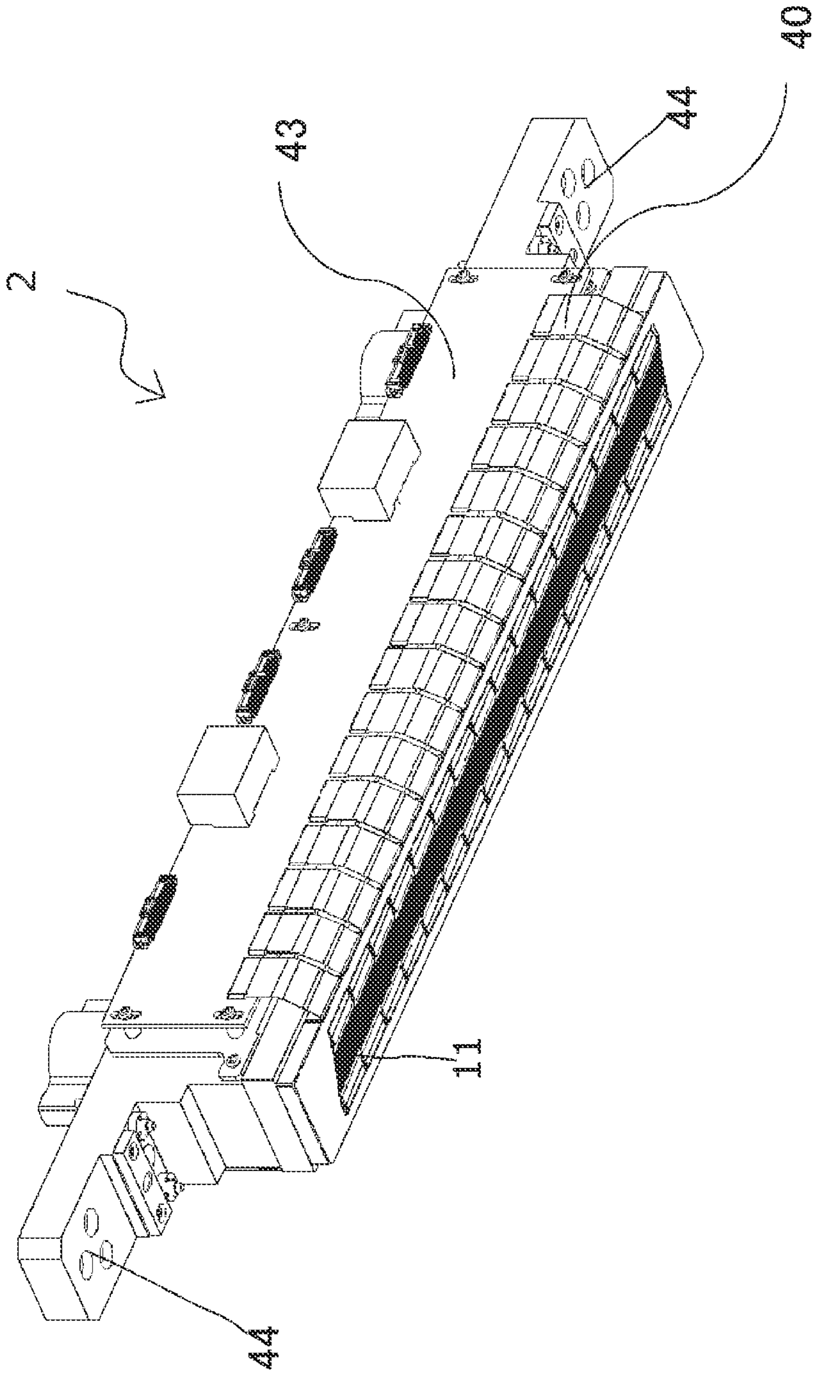
FIG. 2 is a perspective-view diagram of a liquid discharge head.
Figure 3:
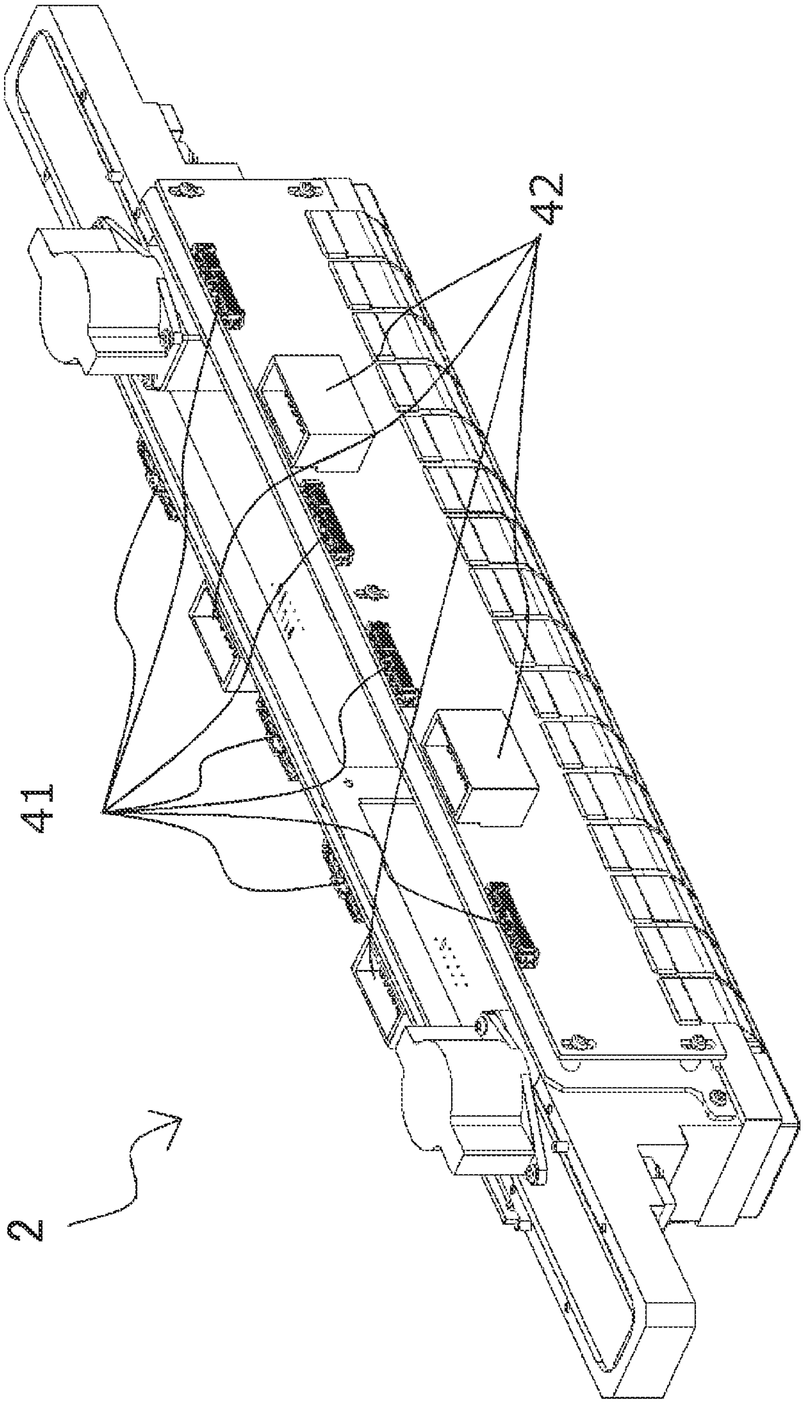
FIG. 3 is a perspective-view diagram of a liquid discharge head in another direction.

An explanation follows next on a configuration of the liquid discharge head 2 according to an embodiment. FIG. 2 and FIG. 3 are perspective-view diagrams of the liquid discharge head 2 according to the present embodiment, from different directions. The liquid discharge head 2 is a line-type liquid discharge head in which 16 recording element substrates 11 are arrayed on a straight line (are arranged in-line). One recording element substrate 11 can discharge ink of one color. In a case where multiple liquid discharge heads 2 are provided for printing a plurality of colors, the liquid discharge heads 2 for discharging inks of respective colors have a same configuration.

As illustrated in FIG. 2 and FIG. 3, the liquid discharge head 2 has recording element substrates 11, flexible wiring boards 40, and an electric wiring board 43 having provided thereon signal input terminals 41 and power supply terminals 42. The signal input terminals 41 and power supply terminals 42 are electrically connected to the control unit 4 of the recording apparatus 1. A discharge drive signal and power necessary for discharge are supplied to the recording element substrates 11 through the signal input terminals 41 and the power supply terminals 42. The number of signal input terminals 41 and power supply terminals 42 can be reduced, relative to the number of recording element substrate 11, through consolidation of wiring by way of the electric circuit of the electric wiring board 43. Using the electric wiring board 43 allows reducing herein the number of electric connections that need to be removed at the time of assembly of the liquid discharge head 2 to the recording apparatus 1 or at the time of replacement of the liquid discharge head. Connection portions 44 provided at respective ends of the liquid discharge head 2 are connected to the ink supply unit 5 of the recording apparatus 1. Ink is supplied from a supply system of the recording apparatus 1 to the liquid discharge head 2 via one of the connection portions 44, and ink having passed through the liquid discharge head 2 is recovered towards the supply system of the recording apparatus 1 via the other connection portion 44. The liquid discharge head 2 is thus configured so that ink can circulate through a path in the recording apparatus 1 and a path in the liquid discharge head 2.

Recording Element Substrate

Figure 4A:
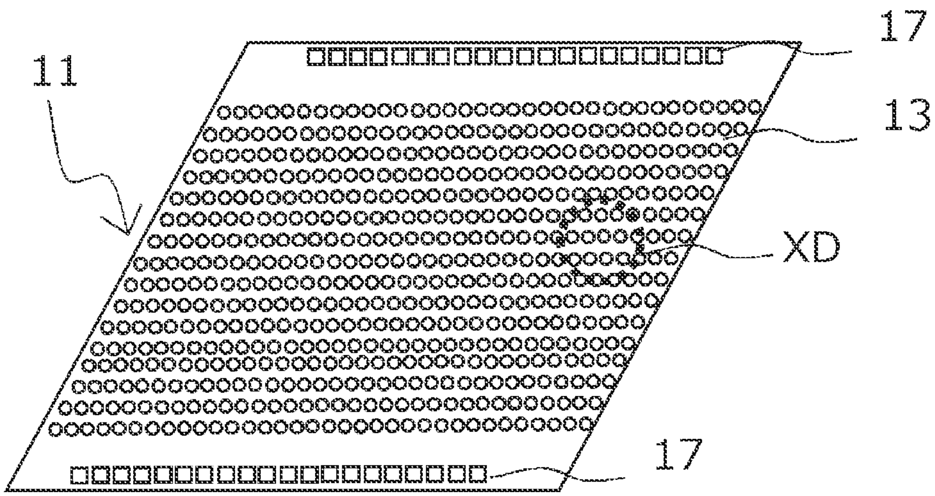
FIG. 4A and FIG. 4B are plan-view diagrams of a recording element substrate.
Figure 4B:
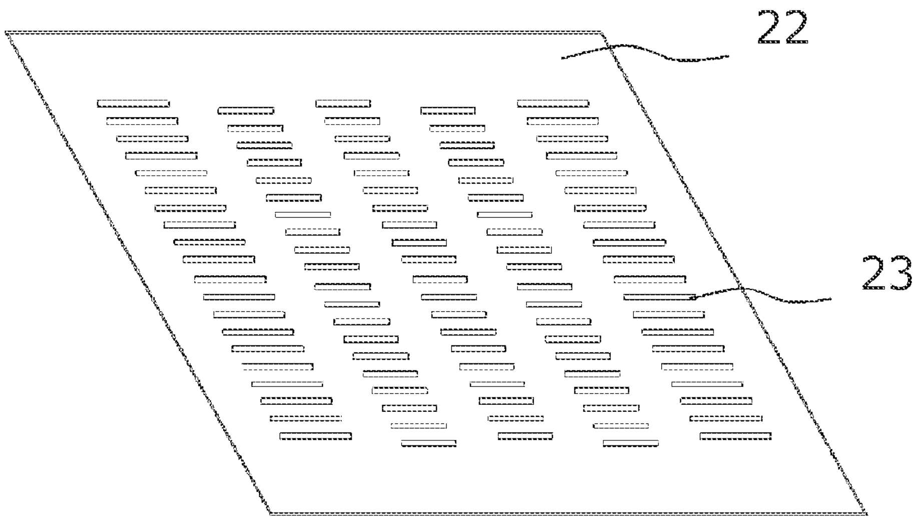
Figure 5A:
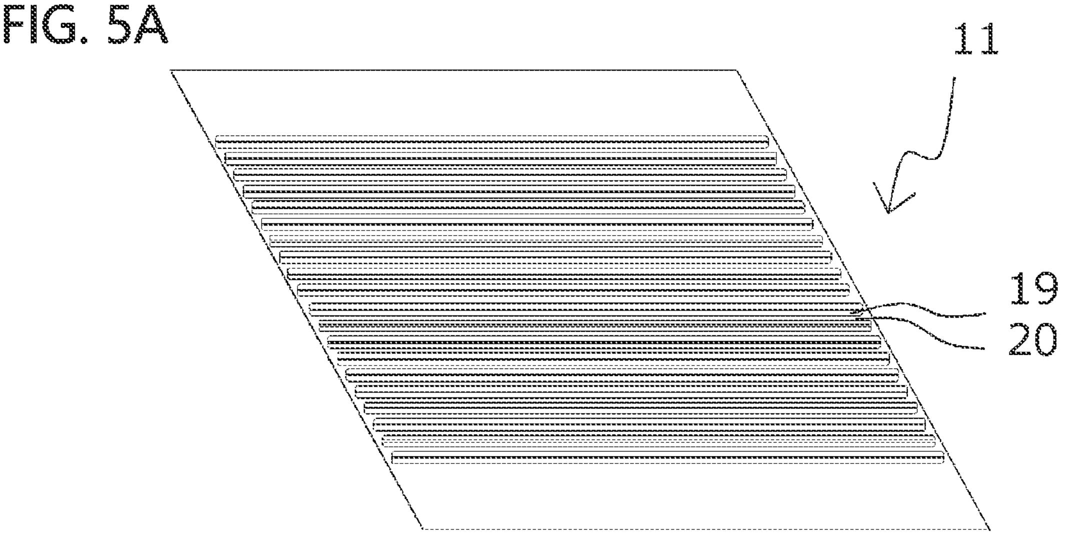
FIG. 5A and FIG. 5B are plan-view diagrams of a recording element substrate.
Figure 5B:
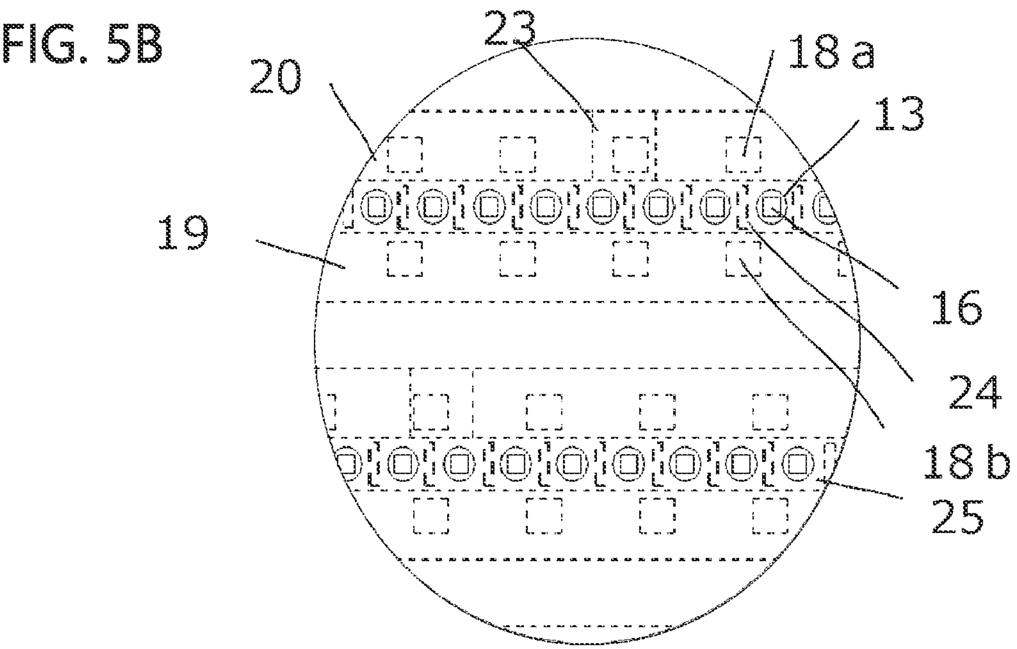
Figure 6:
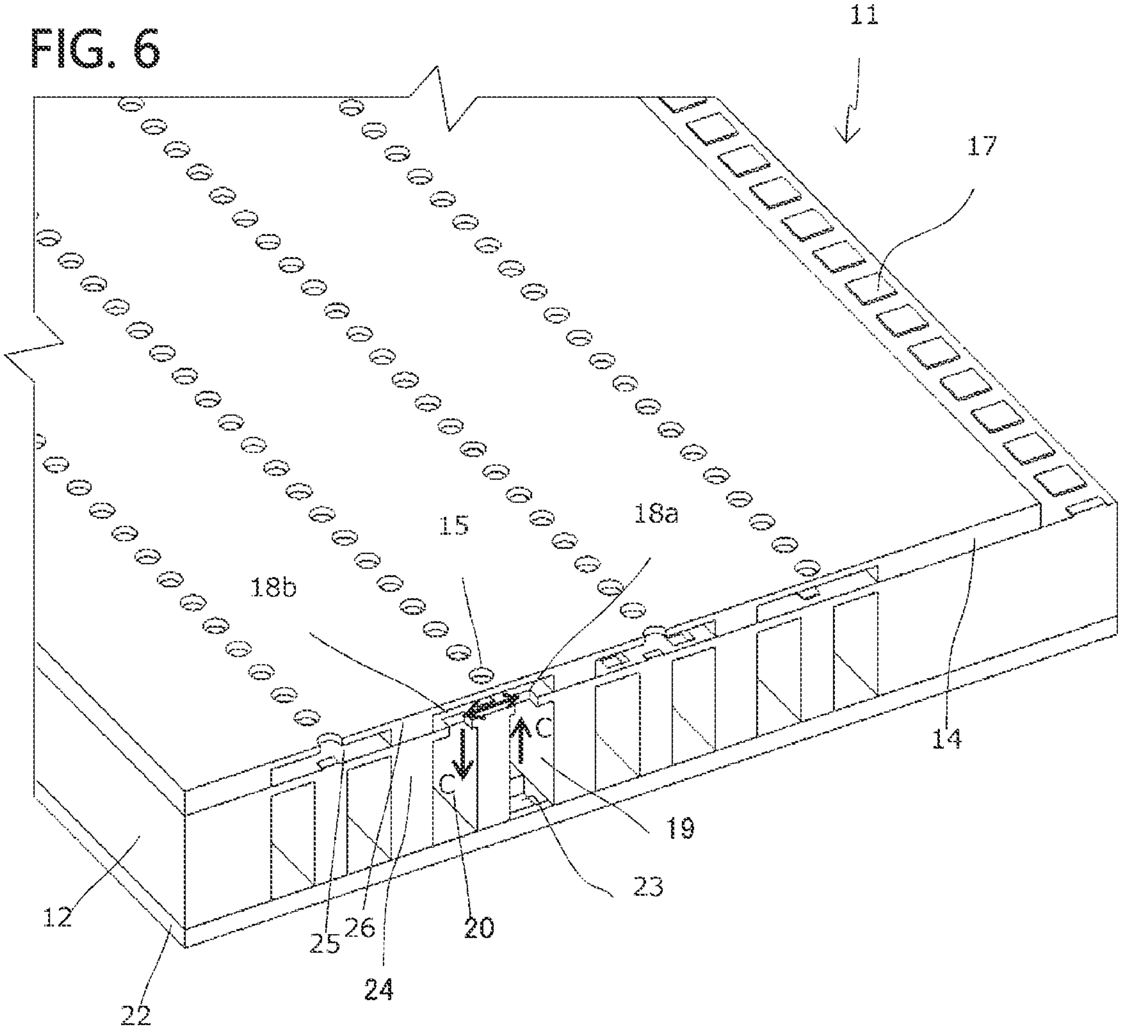
FIG. 6 is a perspective-view diagram illustrating a cross section of a recording element substrate.

FIG. 4A is a schematic diagram of the front surface of one recording element substrate 11, on the side where the discharge ports 13 are disposed, as a substrate for a liquid discharge head. FIG. 4B is a schematic diagram illustrating the reverse surface of the front surface of FIG. 4A. FIG. 5A is a schematic diagram illustrating the back surface of the recording element substrate 11 in a case where a lid member 22 provided on the back side of the recording element substrate 11 in FIG. 4B is removed. FIG. 5B is an enlarged-view diagram of the portion enclosed by the dashed line XD in FIG. 4A. FIG. 6 is a perspective-view diagram illustrating a cross section of the recording element substrate 11.

Each recording element substrate 11 includes a substrate 12 configured through laying up of a plurality of layers on a silicon substrate, a discharge port forming member 14, formed out of a photosensitive resin, and a lid member 22 joined to the back surface of the substrate 12. Multiple discharge port rows 15 are formed in the discharge port forming member 14 of the recording element substrate 11. The direction in which there extend the discharge port rows 15 having the plurality of discharge ports 13 disposed thereon will be referred to hereafter as the "discharge port row direction".

Recording elements 16 are formed on the substrate 12, such that grooves that make up respective supply channels 19 and recovery channels 20 extending along the discharge port row direction are formed on the back surface side of the substrate 12. The recording elements 16 are elements that generate energy used for ejecting a liquid. As illustrated in FIG. 5A, the supply channels 19 and recovery channels 20 extending along the discharge port row direction are provided on the back surface of the recording element substrate 11, the supply channels 19 being provided on one side of a region, and the recovery channels 20 being provided on the other side, with respect to the discharge port rows 15. The supply channels 19 and the recovery channels 20 are provided alternately in a direction that intersects the discharge port row direction.

As illustrated in FIG. 5B, multiple feeding ports 18*a* connected to respective supply channels 19 are arrayed along the discharge port row direction, so as to form a respective feeding port row, while multiple recovery ports 18*b* connected to respective recovery channels 20 form a respective recovery port row.

As illustrated in FIG. 4B and FIG. 6, the sheet-like lid member 22 is laid up on the back surface of the surface, of the substrate 12, on which the discharge port forming member 14 is provided. Multiple openings 23 communicating with respective supply channels 19 and respective recovery channels 20 are provided in the lid member 22. Ink is supplied, through the openings 23 of the lid member 22, from the ink supply unit 5 and through the liquid discharge head 2. The lid member 22 functions as a lid that forms part of the walls of the supply channels 19 and the recovery channels 20, in turn formed in the substrate 12 of each recording element substrate 11.

As illustrated in FIG. 5B, the recording elements 16 as heat generating resistors, for eliciting ink bubbling on account of thermal energy, are disposed at positions corresponding to respective discharge ports 13. Partition walls 24 illustrated in FIG. 5B and FIG. 6 demarcate pressure chambers 25 having respective recording elements 16 in the interior thereof. The recording elements 16 are electrically connected to the terminals 41 in FIG. 3, by electrical wiring provided in the recording element substrate 11. The ink is caused to boil on account of heat generation of the recording elements 16 on the basis of a pulse signal, inputted from the control unit 4 of the recording apparatus 1, via the electric wiring board 43 and the flexible wiring boards 40. The ink is discharged from the discharge ports 13 on account of the force of bubbles arising from this boiling. Although the recording elements 16 are covered with a plurality of layers provided on the substrate 12, as described below, in FIG. 5B the recording elements 16 are illustrated schematically on the surface of the substrate 12.

Figure 7A:
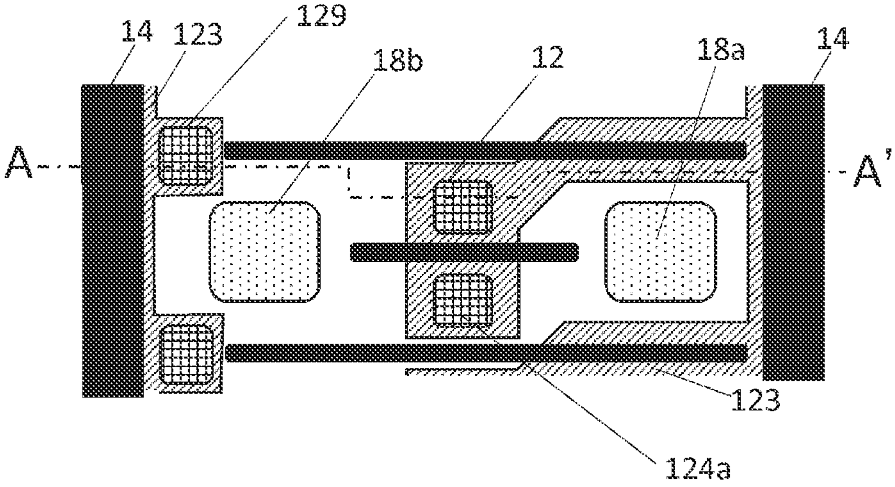
FIG. 7A and FIG. 7B are diagrams illustrating a recording element substrate.
Figure 7B:
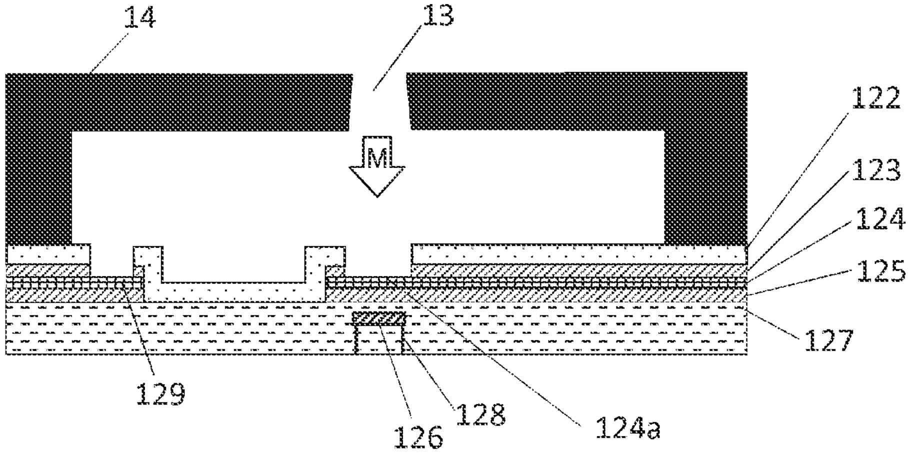

FIG. 7A is a plan-view diagram illustrating schematically an enlarged vicinity of a thermal action portion of the recording element substrate 11, on the surface where the thermal action portion is provided. FIG. 7A illustrates a pressure chamber 25 (liquid chamber) as viewed from the direction in which the discharge ports 13 are provided, but with the discharge port forming member 14 having been removed. FIG. 7B is a schematic cross-sectional diagram along line A-A' in FIG. 7A; in FIG. 7B, the arrow M denotes the direction pointing into the pressure chamber 25 from the direction in which the discharge ports 13 are provided. The second adhesion layer 122 illustrated in FIG. 7B is omitted in FIG. 7A. The thermal action portion is in contact with the ink and imparts heat to the ink, for the purpose of causing the ink to bubble.

The substrate 12 included in the recording element substrate 11 is formed by laying up a plurality of layers on a silicon substrate. In the present embodiment a heat storage layer formed out of for instance a thermal oxide film, a SiO film or a SiN film, is disposed on a silicon substrate. Heat generating resistors 126 as the recording elements 16 are disposed on the heat storage layer. An electrode wiring layer as wiring, formed out of a metallic material such as Al, Al—Si or Al—Cu, is connected, through plugs 128 made up of tungsten or the like, to the heat generating resistors 126. The plugs 128 are disposed forming pairs with the heat generating resistors 126, such that the portions of the heat generating resistors 126 through which current flows via the plugs 128 function herein as heat generation portions for ink discharge. The plugs 128 and the electrode wiring layer are formed in the interior of the heat storage layer. An insulating protective layer 127 is disposed, on the heat generating resistors 126, so as to cover the heat generating resistors 126. The insulating protective layer 127 is made of for instance a SiO film or a SiN film.

A first protective layer 125 and a second protective layer 124 are disposed on the insulating protective layer 127. These protective layers have the role of protecting the surface of the heat generating resistors 126 against chemical and physical impacts that accompany generation of heat by the heat generating resistors 126. For instance, the first protective layer 125 is made up of tantalum (Ta) and the second protective layer 124 is made up of iridium (Ir). The protective layers formed out of these materials have conductivity.

A first adhesion layer 123 and a second adhesion layer 122 are disposed on the second protective layer 124. The first adhesion layer 123, which has the role of improving adhesion between the second protective layer 124 and other layers, is for instance made up of tantalum (Ta). The second adhesion layer 122, which has the role of protecting the other layers against ink, and the role of improving adhesion between other layers and the discharge port forming member 14, is formed for instance out of a SiC or SiCN.

The discharge port forming member 14 is joined to the second adhesion layer 122 side of the substrate 12, and forms, with the substrate 12, ink flow channels that include the pressure chambers 25 in between. The flow channels, including the feeding ports 18*a* and the recovery ports 18*b*, are regions surrounded by the discharge port forming member 14 and the substrate 12. The discharge port forming member 14 has the partition walls 26 provided between adjacent thermal action portions, such that the pressure chambers 25 are demarcated by respective partition walls 26. Each pressure chamber 25 is a liquid chamber that can accommodate a liquid ink.

As illustrated in FIG. 7B, each thermal action portion 124*a* as a first electrode is provided so as to overlap the position where a respective heat generating resistor 126 is provided, as viewed from the direction in which the discharge ports 13 are provided. At the time of ink discharge the temperature of the ink rises instantaneously, on the thermal action portions 124*a*, in the second protective layer 124, that cover the heat generating resistors 126 and that are in contact with the ink, and cavitation occurs on account of bubbles forming and collapsing in the ink. Therefore, the second protective layer 124 that includes the thermal action portions 124*a* is made up of iridium, which exhibits high corrosion resistance and high cavitation resistance. The thermal action portions 124*a* of the second protective layer 124 are disposed between respective feeding ports 18*a* and respective recovery ports 18*b*. The wording "disposed between feeding ports 18*a* and recovery ports 18*b*" signifies that at least part of each thermal action portion 124*a* (second protective layer) is positioned between a respective feeding port 18*a* and a respective recovery port 18*b*.

Electrodes 129, used in a below-described kogation suppression treatment for potential control, are disposed downstream of respective thermal action portions 124*a* of the second protective layer 124 in the flow direction (arrow C in FIG. 6) of ink from the feeding ports 18*a* towards the recovery ports 18*b*, within each pressure chamber 25. As illustrated in FIG. 7B, each electrode 129 as a second electrode is provided so as not to overlap the position at which a respective thermal action portion 124*a*is provided, as viewed from the direction in which the discharge ports 13 are provided. In other words, the electrodes 129 are disposed not on the side of the feeding ports 18*a*, but on the side of the recovery ports 18*b*, as viewed from the thermal action portions 124*a*. In a case where the feeding ports 18*a* are disposed on one side in the row direction of the plurality of thermal action portions 124*a* and the recovery ports 18*b* are disposed on the other side, as illustrated in FIG. 5B, the electrodes 129 are disposed on the side of the recovery ports 18*b*, relative to the row of the thermal action portions 124*a*. Preferably, also the electrode layer that constitutes the electrodes 129 is made up of the same material as that of the second protective layer 124 (iridium), in order to reduce production process load.

Kogation Removal and Potential Control Methods

Kogation removal and potential control methods will be explained next. The second protective layer 124 is conductive, and the thermal action portions 124*a* and the electrodes 129 make up respective pairs of electrodes (first electrode and second electrode) such that ink is sandwiched therebetween. Kogation is removed herein when the control unit 4 applies a potential to the thermal action portions 124*a* and the electrodes 129, so that the second protective layer 124 in the portions of the thermal action portions 124*a* elutes into the ink as a result of an electrochemical reaction. Potential control for kogation prevention is effected when the control unit 4 applies potential to the thermal action portions 124*a* and the electrodes 129, so as to reduce the abundance of colloidal particles within the ink on the thermal action portions 124*a*.

Control System Configuration

Figure 8:
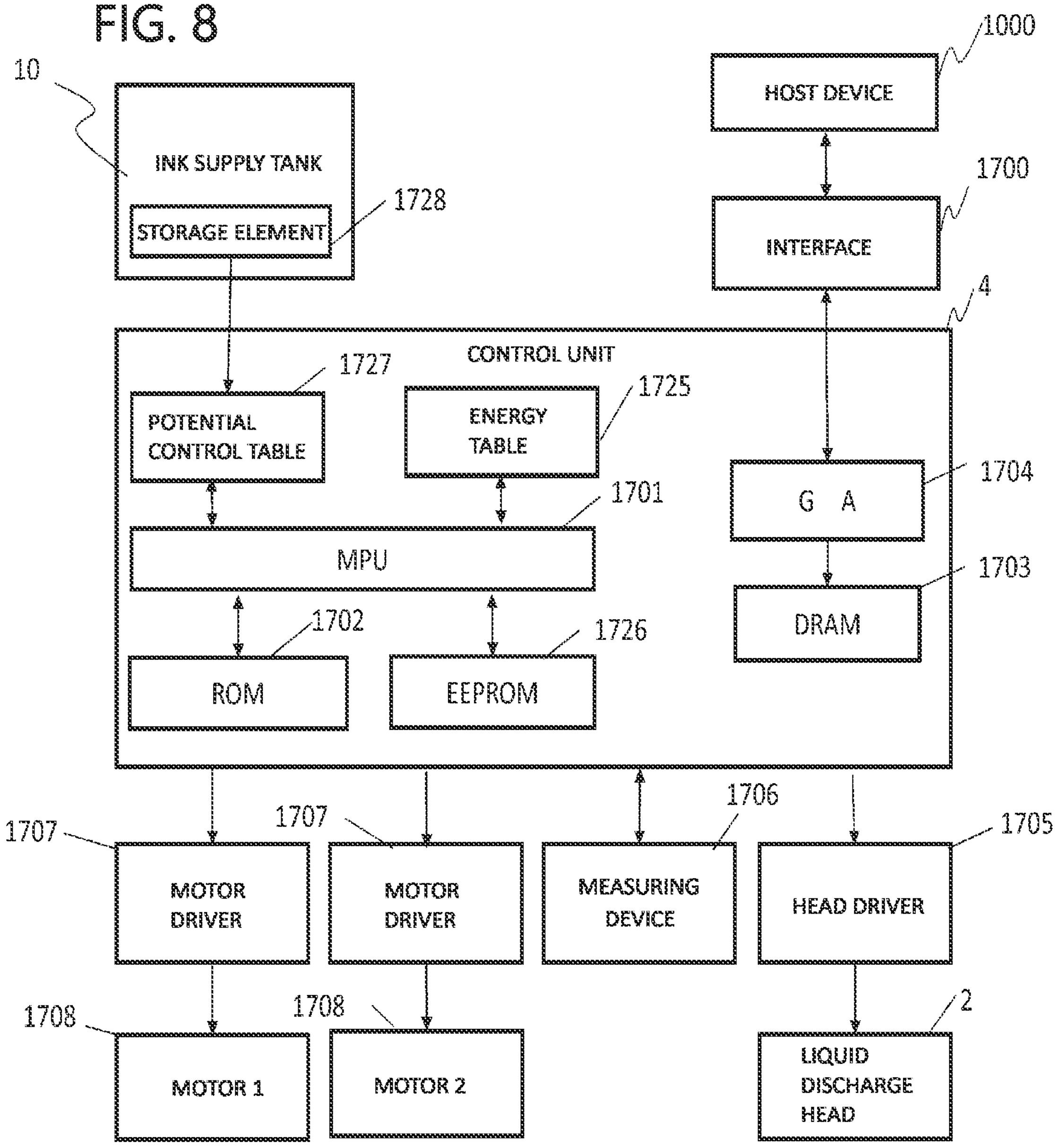
FIG. 8 is a block diagram illustrating the schematic configuration of a control system of a recording apparatus.

FIG. 8 is a block diagram illustrating a configuration example of a control system in the recording apparatus 1 having the above configuration. In FIG. 8, a host device 1000 is a device, external to the recording apparatus 1, and that is embodied as appropriate for instance in the form of a computer, a digital camera or a scanner. An interface 1700 receives a recording signal that includes commands and image data, sent from the host device 1000. Status information about the recording apparatus is sent to the host device 1000, as needed.

The control unit 4 includes an MPU 1701, a ROM 1702, a DRAM 1703, a gate array 1704 (GA), an energy table 1725, a nonvolatile memory 1726 such as an EEPROM, and a potential control table 1727. The MPU 1701 controls each unit in the recording apparatus 1 according to a control program and required data, stored in the ROM 1702 and corresponding to below-described procedures of a cleaning process and an energy setting process. Instances of the data stored in the ROM 1702 include the shape and application time of a drive pulse that is applied to the heat generating resistors 126, the voltage that is applied to the thermal action portions 124*a* and to the electrodes 129, as well as other regular drive conditions of the liquid discharge head 2. The data stored in the ROM 1702 can also include a recording medium transport condition, carriage speed and so forth.

The DRAM 1703 stores various data (such as the above recording signal, and recording data that are supplied to the head). The DRAM 1703 can be provided with areas for flags that are used in a below-described control process. The gate array 1704 controls the supply of recording data to the liquid discharge head 2 and controls transfer of data between the interface 1700, the MPU 1701 and the DRAM 1703. The energy table 1725 stores data for determining the energy required for ink discharge, for instance the pulse width of a discharge signal. The potential control table 1727 stores particulars about storage elements 1728, typified by a ROM, within the ink supply tank. Information is written automatically in the potential control table 1727 upon replacement of the ink tank, and the information in the potential control table 1727 is deleted upon removal of the ink tank.

Each storage element 1728 of a respective ink supply tank stores ink production information such as information denoting ink type and information denoting ink production timings. The storage element 1728 further stores the above-described kogation removal and potential control conditions that apply to the thermal action portions 124*a* and electrodes 129. The storage element 1728 further stores a table or calculation method (calculation expression), in accordance with a below-described flowchart, for deriving kogation removal and potential control conditions from stored ink information, and ink properties and ink discharge properties measured in accordance with the present invention. Required data is saved in the nonvolatile memory 1726 also when the recording apparatus is powered off. Ink production information includes for instance product name, production lot number, model number, production number and production timing. The production timing is typically the production date. The production timing is however not limited thereto, and may be brief information such as month, quarter or year. Alternatively, the control unit may acquire production timing information by searching an external database on the basis of the production number.

A head driver 1705 drives the liquid discharge head 2, performs a cleaning operation, and performs a discharge energy setting operation. A measuring device 1706 detects for instance the conductivity of the ink and an ink discharge property using the ink physical property measuring device 7 and the ink discharge property measuring device 8, such as those illustrated in FIG. 1. The recording apparatus 1 also has various motors 1708 and motor drivers 1707 (two of each are illustrated in the figure), for performing printing, and that are controlled by the control unit 4.

Embodiment 1

Figure 9:
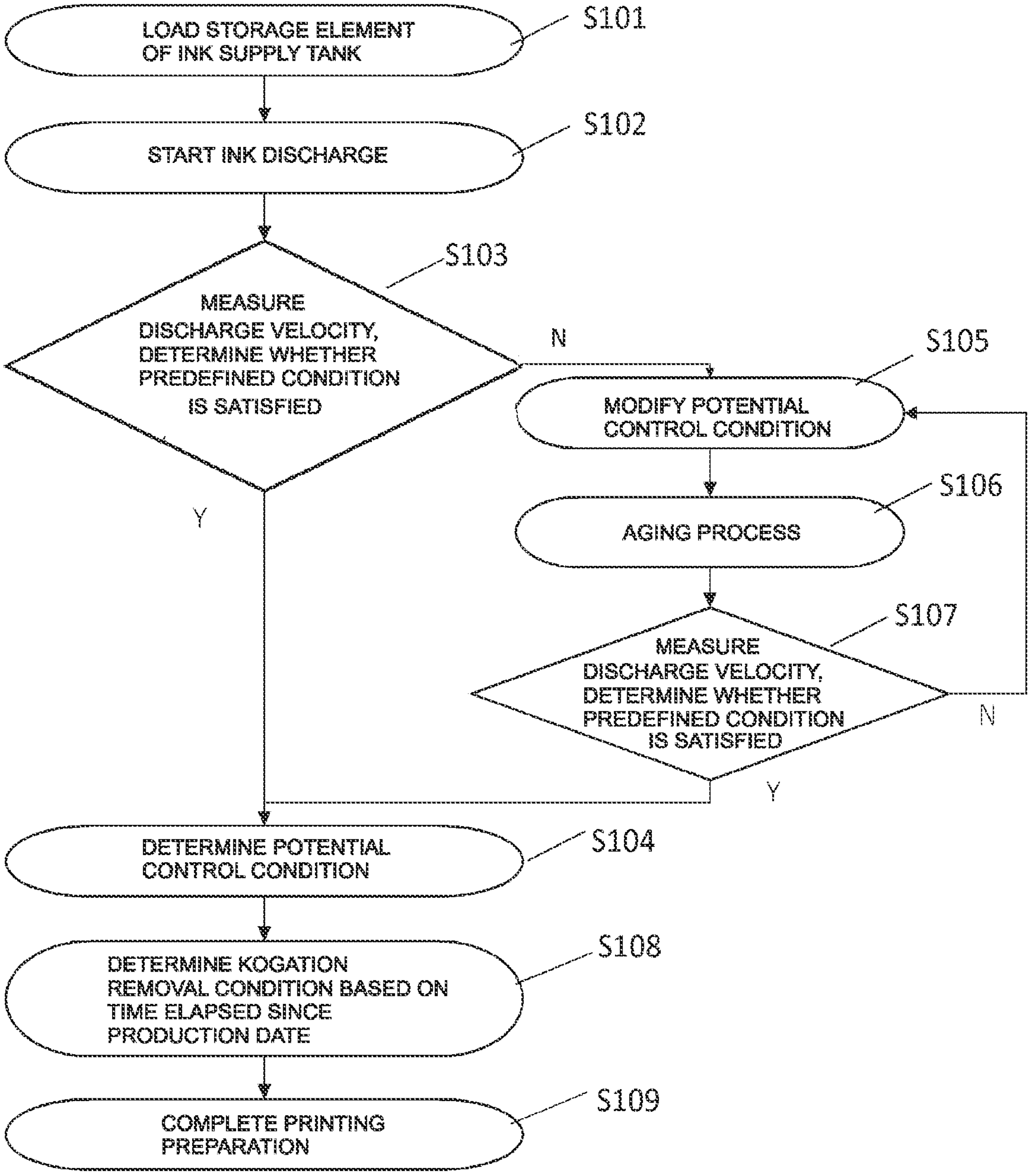
FIG. 9 is a flowchart illustrating processing in Embodiment 1.

FIG. 9 is a flowchart of kogation removal and potential control condition determination, performed in the recording apparatus in Embodiment 1. FIG. 9 illustrates an actual control procedure. As Embodiment 1, an instance will be illustrated in which the potential control condition is not changed.

The present flow starts at the point in time at which an ink supply tank 10 is fitted to the ink supply unit 5 and the host device 1000 issues an instruction so as to read information in the respective storage element 1728.

In step S101 the control unit 4 stores the content of the storage element 1728 in the potential control table 1727. In step S102 next, the control unit 4 initiates ink discharge under the discharge conditions in the energy table 1725 and under standard potential control condition in the potential control table 1727. In step S103 next, the control unit 4 causes the measuring device 1706 to measure ink discharge velocity by way of the ink discharge property measuring device 8, and determines thereupon whether the value of the discharge velocity satisfies or not a predetermined condition. In S103, the discharge velocity may be compared with a predetermined value, such that a below-described aging process is performed when the discharge velocity is equal to or lower than the predetermined value. The flow may proceed to the aging process in a case where the discharge velocity is higher than a predetermined value. The flow may also proceed to the aging process in a case where the discharge velocity lies within a predetermined range.

If the discharge velocity satisfies a predetermined condition of discharge velocity in the potential control table 1727 (S103=Y), the flow proceeds to a potential control condition determination (step S104), and the determined potential control condition is written to the nonvolatile memory 1726. The potential control condition determined in this step varies depending on ink type and the given situation. Typically, control is performed so as to raise potential (increase the potential difference between the electrodes 129 and the thermal action portions 124*a*) when the viscosity of the ink increases (i.e., when the proportion of pigment increases). When the potential is increased, the effect of keeping ink pigments away from the surface of a heater becomes more pronounced, but conversely the life of the protective film may be shortened. In determining the potential control condition, it is therefore preferable to properly correct default conditions in accordance with the elapsed time. This correction is typically performed so as to expand the potential difference, from a default value, in response to increases in ink viscosity over time.

In step S108 next, the control unit 4 calculates a production elapsed time from the production date of the ink as recorded in the potential control table 1727. The control unit 4 refers to the potential control table 1727, and reads and determines a kogation removal condition that is derived from the production elapsed time.

An explanation follows next on reasons why the kogation removal condition is determined on the basis of the time elapsed from the production of the ink. Kogation removal is a process in which potential is applied to an electrode, to electrochemically dissolve the electrode material into the ink, and remove kogation at the top of the electrode. Kogation removal, which serves the purpose of cleaning the electrode, is carried out multiple times at given intervals. The upper limit of the number of times that kogation removal can be performed is determined by the film thickness of the electrode. The electrode dissolution amount is significantly influenced by the conductivity of the ink, such that in a case where conductivity is high, the electrode dissolves to a greater extent, and disappears faster than predicted, as compared with a case where conductivity is low. The solvent volatilizes as time goes by, after production of the ink, and accordingly the conductivity of the ink changes with time. In the present embodiment, therefore, the conductivity of the ink is predicted on the basis of the time elapsed after the ink is produced, and there is selected a kogation removal condition according to the conductivity. In step S109 lastly, the control unit 4 writes the selected kogation removal condition to the nonvolatile memory 1726, to complete a printing preparation.

An explanation follows next on an instance where the discharge velocity in step S103 of FIG. 9 does not satisfy a predetermined condition (S103=N). In this case it is necessary to modify the potential control condition. Specifically, the voltages of the thermal action portions 124*a* and of the electrodes 129 are modified.

The presence of an ink colloid on the thermal action portions 124*a* is reduced when potential of polarity identical to that of potential with which the colloid in the ink is charged is applied to the thermal action portions 124*a*. For instance, if there is a lot of negatively charged colloid, also the voltage applied to the thermal action portions 124*a* is set to be negative. When on the other hand the probability of a colloid being present on the electrode drops, the mass of discharged ink changes, and accordingly the discharge velocity changes as compared with an instance where potential is not controlled. The potential control condition is ordinarily determined with the above considerations factored in; however, the ink solvent volatilizes, the viscosity of the ink increases, and the mass of ink at the time of discharge is different than expected, depending on the state of storage of the ink, and on the number of days elapsed since production. These are the underlying causes of changes in discharge velocity.

Accordingly, the above phenomena are corrected in accordance with the procedure below. In step S105 the control unit 4 reads data recorded on the potential control table 1727, on the basis of the measured discharge velocity, and modifies the potential control condition. In step S106 next, the control unit 4 performs an aging process of discharging ink for a certain period of time under the conditions determined in step S105. Herein, the aging process corresponds to a warm-up operation for stabilizing the operation of a heater that has the heat generating resistors 126. In the present flow, specifically, the heater is determined to be not stable, and an aging process is performed, in a case where the ink discharge velocity does not fall within a predetermined range despite the fact that the ink is discharged under control conditions derived from experimental data during product development.

In step S107 next, the control unit 4 measures the discharge velocity once more. If the discharge velocity satisfies a predetermined condition in the discharge velocity potential control table 1727 (S107=Y), the flow proceeds to step S104, to determine the potential control condition. Processing in steps S104 to S109 is identical to that of Embodiment 1. When by contrast the discharge velocity does not satisfy the predetermined condition (S107=N), the flow returns again to step S105, for modification of the potential control condition.

Herein there may be prescribed an upper limit of the number of times that the flow returns from step S107 to step S105. When in this case the above number of returns exceeds a specified number of times, a warning may be issued to the user, via the host device 1000, urging the user to change over to manual kogation removal.

Embodiment 2

Figure 10:
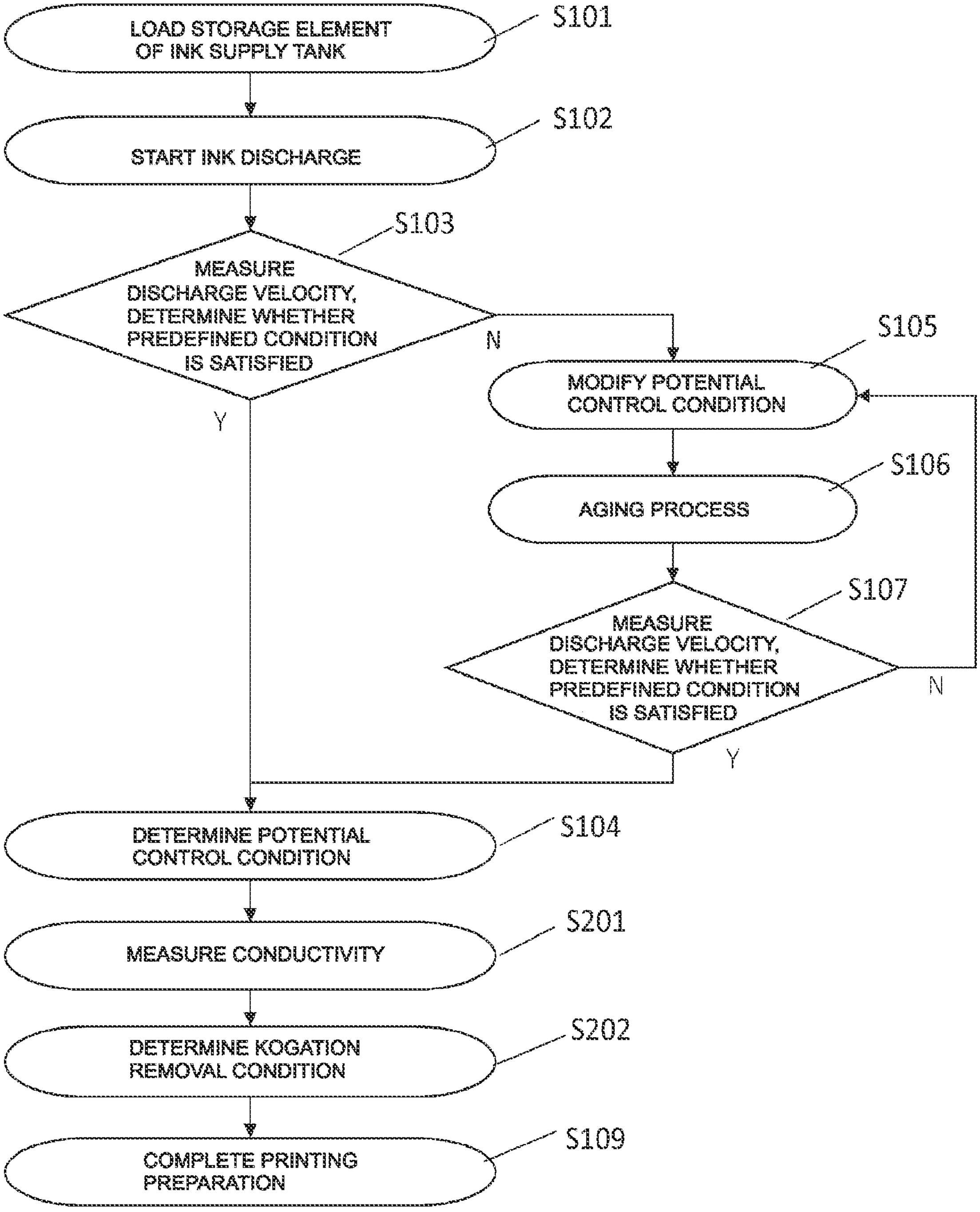
FIG. 10 is a flowchart illustrating processing in Embodiment 2.

As Embodiment 2, an explanation follows next, on the basis of the flowchart of FIG. 10, on the determination of kogation removal and potential control conditions in a case where the ink physical property measuring device 7 is used. Portions identical to those of Embodiments 1 and 2 are denoted by the same reference symbols, and an explanation thereof will be omitted.

Processing from step S101 to step S104 is performed in the same way as in the case of FIG. 9. Processing in steps S105 to S107 in a case where the discharge velocity lies outside a predetermined range is likewise identical to that in the case of FIG. 9.

After determination of the potential control condition in step S104, in the present embodiment, the control unit 4 causes the measuring device 1706 to measure the conductivity of the ink by way of the ink physical property measuring device 7, in step S201. That is, in step S108 of FIG. 9, the kogation removal condition is determined on the basis of the production elapsed time, whereas in the present embodiment, the conductivity of the ink is measured directly. In step S202 next, the control unit 4 refers to the potential control table 1727, reads the kogation removal condition derived from the measured conductivity, and determines the read condition as a condition at the time of execution. In step S109 the determined condition is written to the nonvolatile memory 1726, to complete the printing preparation.

In Embodiments 1 and 2, the ink discharge velocity is measured as the ink discharge property, and the conductivity of the ink is measured as the ink physical property. However, the ink discharge property and ink physical property are not limited to the foregoing, and other measured values may be used.

Embodiment 3

Figure 11:
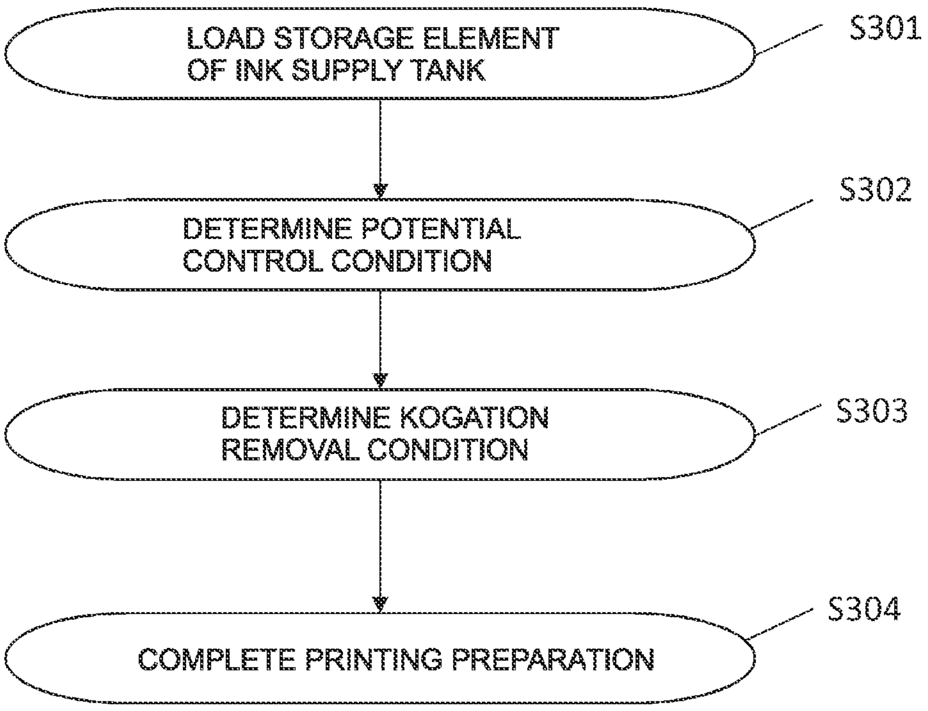
FIG. 11 is a flowchart illustrating processing in Embodiment 3.

As Embodiment 3, an explanation follows next on potential control condition determination for kogation removal in a case where no measuring device is used. FIG. 11 is a flowchart illustrating processing in the present embodiment.

Upon start of the flow, the control unit 4 stores the content of the storage element 1728 in the potential control table 1727, in step S301. In step S302 next, the control unit 4 calculates a production elapsed time, on the basis of a difference between the production date of the ink recorded in the potential control table 1727 and the current point in time. The control unit 4 refers to the potential control table 1727, and reads out and determines a potential control condition derived from the production elapsed time. In step S303 next, the control unit 4 refers to the potential control table 1727, and reads out and determines a kogation removal condition derived from the production elapsed time. In step S304, lastly, the control unit 4 writes each condition to the nonvolatile memory 1726, to complete the printing preparation.

In Embodiments 1 to 3 above, the kogation removal condition and the potential control condition are selected using the time elapsed since ink production, but the present invention is not limited thereto. If available composition change information denoting a change in ink composition may be used besides the production elapsed time. Any information may be used herein so long as it allows selecting the conditions listed in the potential control table, for instance ink types or production lot numbers.

In Embodiments 1 to 3 above, operations are initiated immediately after replacement of an ink supply tank, but the present invention is not limited thereto. For instance, the above flow may be executed while ink is being used. The embodiments can be carried out at an arbitrary timing other than at the time of actual printing. For instance, the present flow may be performed at the time of maintenance of the apparatus, or may be performed periodically according to a print count, or in accordance with the usage time of the apparatus.

In the embodiments, the information denoting the time elapsed from production is acquired on the basis of information stored in a storage element, but the present invention is not limited thereto. For instance, information may be acquired on the basis of user input. The control unit may determine a state of change of ink composition, and may modify the potential control condition, on the basis of information denoting the environment in which the ink is stored, instead of on the basis of information denoting the time elapsed since production, or along with the information denoting the time elapsed since production. The storage element 1728 need not necessarily store all ink types, production information, potential control condition tables and calculation expressions. For instance, the storage element 1728 may just store information denoting ink type and a production timing, and the control unit may search an external database on the basis of this information, to acquire the potential control condition.

As described above, in the present invention the state of change in composition of the ink is determined on the basis of ink production information and information about potential control and kogation removal conditions written in the storage element of the ink tank, and potential is controlled according to conditions conforming to the composition. The state of change in the composition of the ink can be determined on the basis of results of measurements by a device that measures ink properties and that is provided in the inkjet recording apparatus. Ink properties include for instance a physical property (typically ink conductivity) measured by an ink physical property measuring device, and a discharge property (typically ink discharge velocity) measured by an ink discharge property measuring device. Changes in the ink over time, as well as changes derived from the installation environment, can be adjusted by setting the potential values of a plurality of electrodes that form an electric field in the liquid discharge head, on the basis of these measurement results. In consequence it becomes possible to set kogation removal and potential control conditions suitable for the state of the ink, and to achieve long-term stable discharge. Furthermore, in the present invention, the "physical properties of the ink" can include, for example, the viscosity of the ink, the particle size of the contained substances (pigments, etc.), and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-188657, filed on Nov. 25, 2022, which is hereby incorporated by reference herein in its entirety.

What is claimed is:

1. A liquid discharge apparatus, comprising:

a liquid discharge head having a discharge port for discharging a liquid, a liquid chamber configured to communicate with the discharge port, a heat generating resistor provided in the liquid chamber and configured to be capable, by generating heat, of discharging the liquid from the discharge port, and a first electrode and a second electrode provided in the liquid chamber; and a control unit configured to control application of potential to the first electrode and the second electrode, on the basis of a potential control condition according to the type of the liquid, wherein, with the liquid chamber viewed from a direction in which the discharge port is provided, the first electrode is provided so as to overlap a position at which the heat generating resistor is provided, and the second electrode is provided so as not to overlap a position at which the first electrode is provided;

the control unit is configured to modify the potential control condition in accordance with changes in physical properties of the liquid;

a tank configured to supply the liquid to the liquid chamber can be mounted on the liquid discharge apparatus;

the tank has a storage element configured to store the potential control condition in accordance with the type of the liquid; and the control unit is configured to, upon mounting of the tank, apply potential to the first electrode and the second electrode using the potential control condition acquired from the storage element.

2. The liquid discharge apparatus according to claim 1, wherein he storage element of the tank is configured to store information denoting a production timing of the liquid; and the control unit is configured to modify the potential control condition on the basis of the production timing of the liquid.

3. The liquid discharge apparatus according to claim 2, wherein the storage element of the tank is configured to store a table or calculation expression for modifying the potential control condition in accordance with elapsed time since the production timing of the liquid; and the control unit is configured to calculate the elapsed time on the basis of the production timing, and to modify the potential control condition using the table or the calculation expression.

4. The liquid discharge apparatus according to claim 1, further comprising:

a discharge property measuring unit configured to measure a discharge property of the liquid, wherein the storage element of the tank is configured to store a table or calculation expression for modifying the potential control condition in accordance with the discharge property; and the control unit is configured to modify the potential control condition using the discharge property measured by the discharge property measuring unit, and the table or the calculation expression.

5. The liquid discharge apparatus according to claim 4, wherein the discharge property measuring unit is configured to measure a discharge velocity of the liquid as the discharge property.

6. The liquid discharge apparatus according to claim 1, further comprising:

a physical property measuring unit configured to measure the physical property of the liquid, wherein the storage element of the tank is configured to store a table or calculation expression for modifying the potential control condition in accordance with the physical property; and the control unit is configured to modify the potential control condition using the physical property measured by the physical property measuring unit, and the table or the calculation expression.

7. The liquid discharge apparatus according to claim 6, wherein the physical property measuring unit is configured to measure conductivity of the liquid as the physical property.

8. The liquid discharge apparatus according to claim 1, wherein the storage element of the tank is configured to store information denoting the type of the liquid.

9. A method for controlling a liquid discharge apparatus that includes a liquid discharge head having a discharge port for discharging a liquid, a liquid chamber configured to communicate with the discharge port, a heat generating resistor provided in the liquid chamber and configured to be capable, by generating heat, of discharging the liquid from the discharge port, and a first electrode and a second electrode provided in the liquid chamber; and a control unit, such that, with the liquid chamber viewed from a direction in which the discharge port is provided, the first electrode is provided so as to overlap a position at which the heat generating resistor is provided, and the second electrode is provided so as not to overlap a position at which the first electrode is provided;

the method comprising:

a step of controlling, by way of the control unit, application of potential to the first electrode and the second electrode, on the basis of a potential control condition according to the type of the liquid, wherein the control unit is configured to modify the potential control condition in accordance with changes in physical properties of the liquid;

wherein a tank configured to supply the liquid to the liquid chamber can be mounted on the liquid discharge apparatus;

wherein the tank has a storage element configured to store the potential control condition in accordance with the type of the liquid; and wherein in the step of controlling, the control unit is configured to, upon mounting of the tank, apply potential to the first electrode and the second electrode using the potential control condition acquired from the storage element.

* * * * *